(12) United States Patent
Ito

(10) Patent No.: US 10,440,215 B2
(45) Date of Patent: Oct. 8, 2019

(54) IMAGE READING APPARATUS

(71) Applicant: Brother Kogyo Kabushiki Kaisha, Nagoya-shi, Aichi-ken (JP)

(72) Inventor: Tetsuo Ito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/117,365

(22) Filed: Aug. 30, 2018

(65) Prior Publication Data

US 2019/0068823 A1    Feb. 28, 2019

(30) Foreign Application Priority Data

Aug. 30, 2017  (JP) ................................ 2017-165192

(51) Int. Cl.
*H04N 1/04*  (2006.01)
*H04N 1/12*  (2006.01)
*H04N 1/00*  (2006.01)

(52) U.S. Cl.
CPC ......... *H04N 1/121* (2013.01); *H04N 1/00602* (2013.01); *H04N 1/00604* (2013.01); *H04N 1/00615* (2013.01); *H04N 1/00628* (2013.01); *H04N 1/00689* (2013.01); *H04N 1/00702* (2013.01); *H04N 1/00793* (2013.01)

(58) Field of Classification Search
CPC ............... H04N 1/121; H04N 1/00602; H04N 1/00604; H04N 1/00616; H04N 1/00628; H04N 1/00689; H04N 1/00702; H04N 1/00793

USPC .................................................. 358/498, 496
See application file for complete search history.

(56) References Cited

U.S. PATENT DOCUMENTS

| | | | |
|---|---|---|---|
| 5,653,437 A | 8/1997 | Inoue et al. | |
| 7,194,219 B2 * | 3/2007 | Sato ................... | G03G 15/5016 399/367 |
| 8,587,850 B2 * | 11/2013 | Miyamoto ............... | H04N 1/56 358/474 |
| 2004/0234292 A1 * | 11/2004 | Sato ................... | G03G 15/5016 399/107 |

(Continued)

FOREIGN PATENT DOCUMENTS

| | | |
|---|---|---|
| JP | H11-208896 A | 8/1999 |
| JP | 3314529 B2 | 8/2002 |
| JP | 2009-173450 A | 8/2009 |

(Continued)

*Primary Examiner* — Cheukfan Lee

(74) *Attorney, Agent, or Firm* — Banner & Witcoff, Ltd.

(57) ABSTRACT

An image reading apparatus, having a housing, a feed tray, and a reader sensor, is provided. The housing includes a reversing guide, a discharge tray, and an opening. The reversing guide is configured to reverse a first face and a second face of a sheet and guide the sheet from a first position toward a second position in a direction from a rear side toward a front side at the first position and in a direction from the front side toward, the rear side at the second position. The discharge tray is arranged at a position lower than the reversing guide and is configured to support the sheet discharged from the conveyer path. The opening is formed between the reversing guide and the discharge tray and is configured to expose the sheet supported by the discharge tray so that the sheet is removed through the front side of the housing.

10 Claims, 7 Drawing Sheets

(56) References Cited

U.S. PATENT DOCUMENTS

2013/0222867 A1    8/2013    Tomita

FOREIGN PATENT DOCUMENTS

| JP | 2013-052929 A | 3/2013 |
| JP | 5181705 B2 | 4/2013 |
| JP | 2013-173584 A | 9/2013 |

* cited by examiner

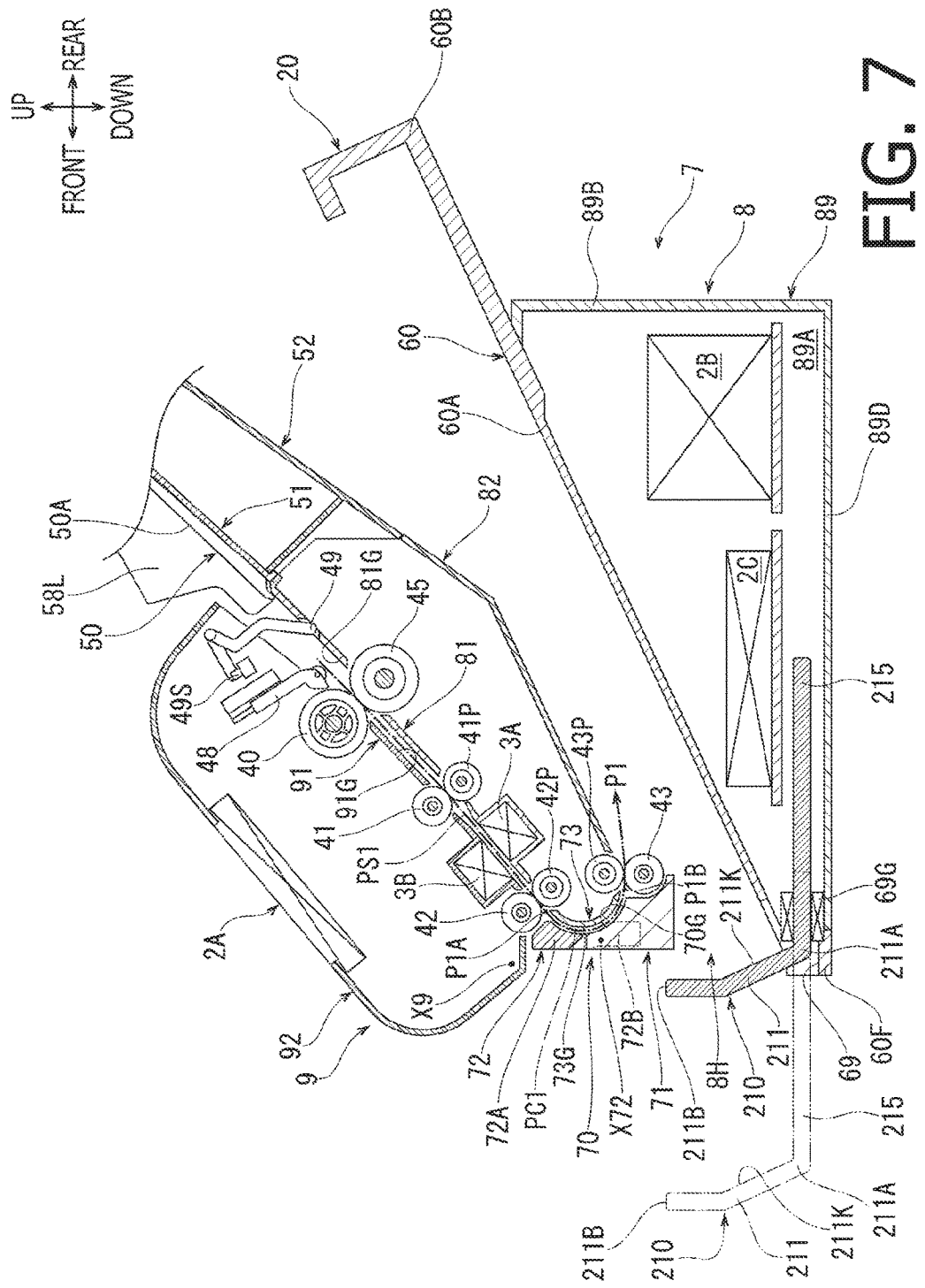

IMAGE READING APPARATUS

CROSS-REFERENCE TO RELATED APPLICATION

This application claims priority under 35 U.S.C. § 119 from Japanese Patent Application No. 2017-165192, filed on Aug. 30, 2017. The entire subject matter of the application is incorporated herein by reference.

BACKGROUND

Technical Field

The following disclosure is related to an aspect of an image reading apparatus.

Related Art

An image reading apparatus having a housing, a feed tray, an image reader sensor, and a discharge tray, is known. The housing may include a first housing and a second housing, and inside the housing, a conveyer path may be formed. The conveyer path may extend from a rear side toward a front side in the housing. The feed tray may be arranged on the rear side of the housing to support a sheet to be fed to the conveyer path. The image reader sensor may read an image on the sheet being conveyed in the conveyer path. The discharge tray may be arranged on the front side of the housing at a lower-frontward position with respect to an exit of the conveyer path to extend further frontward from the exit of the conveyer path. The discharge tray may support the sheet discharged from the conveyer path.

SUMMARY

The feed tray, the conveyer path, and the discharge tray in the known image reading apparatus align in line along a direction of depth, e.g., a front-rear direction. Due to the straight or linear arrangement of the feed tray the conveyer path, and the discharge tray, it may be difficult to downsize the image reading apparatus in the front-rear direction.

An aspect of the present disclosure is advantageous in that an image reading apparatus, of which dimension in a front-rear direction is reducible, is provided.

According to an aspect of the disclosure, an image reading apparatus, having a housing, a feed tray, and a reader sensor, is provided. In the housing, a conveyer path is formed, and an operation panel is arranged on a front side of the housing. The feed tray is configured to support a sheet to be fed to the conveyer path. The reader sensor is configured to read an image on the sheet being conveyed in the conveyer path. The housing includes a reversing guide, a discharge tray, and an opening. The reversing guide forms a part of the conveyer path. The reversing guide is configured to reverse a first face of the sheet and a second face of the sheet. The reversing guide is configured to guide the sheet from a first position in the conveyer path toward a second position lower than the first position in the conveyer path. The reversing guide is configured to guide the sheet in a direction from a rear side toward the front side in the housing at the first position and in a direction from the front side toward the rear side in the housing at the second position. The discharge tray is arranged at a position lower than the reversing guide. The discharge tray is configured to support the sheet discharged from the conveyer path. The opening is formed between the reversing guide and the discharge tray. The opening is configured to expose the sheet supported by the discharge tray so that the sheet is removable through the front side of the housing from the discharge tray.

BRIEF DESCRIPTION OF THE ACCOMPANYING DRAWINGS

FIG. 7 is a cross-sectional view of an image reading apparatus according to a second embodiment of the present disclosure.

DETAILED DESCRIPTION

Hereinafter, with reference to the accompanying drawings, described below will be embodiments of the present disclosure.

First Embodiment

In the example embodiment described below, orientation concerning the image reading apparatus 1 will be referred to based on directions indicated by arrows shown in each drawing. For example, a viewer's lower-right side appearing in FIG. 1, on which an operation panel 2A is arranged, is referred to as a front side of the image reading apparatus 1. An upper-left side in FIG. 1, opposite to the front face, is referred to as a rear side. A left-hand side to the user who faces the front side of the image reading apparatus 1, which corresponds to the viewer's lower-left side, is referred to as a leftward side, and an opposite side from the left, which corresponds to the viewer's upper-right side, is referred to as a rightward side of the image reading apparatus 1. The right-to-left or left-to-right direction of the image reading apparatus 1 may also be referred to as a widthwise. The up-to-down or down-to-up direction in FIG. 1 may be referred to as a vertical direction of the image reading apparatus 1.

<Overall Configuration>

Figure 1:
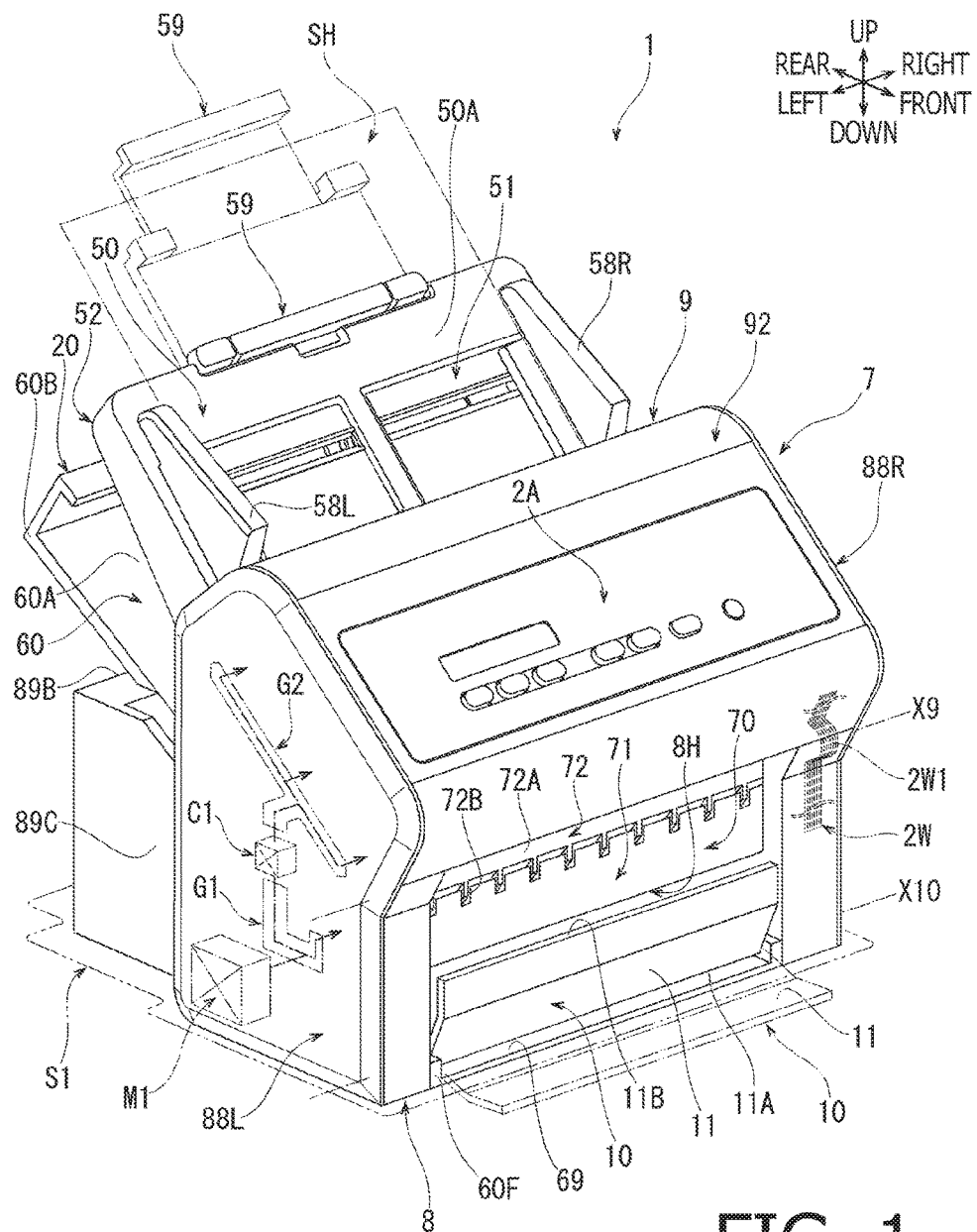
FIG. 1 is a perspective view of an image reading apparatus according to a first embodiment of the present disclosure.
Figure 2:
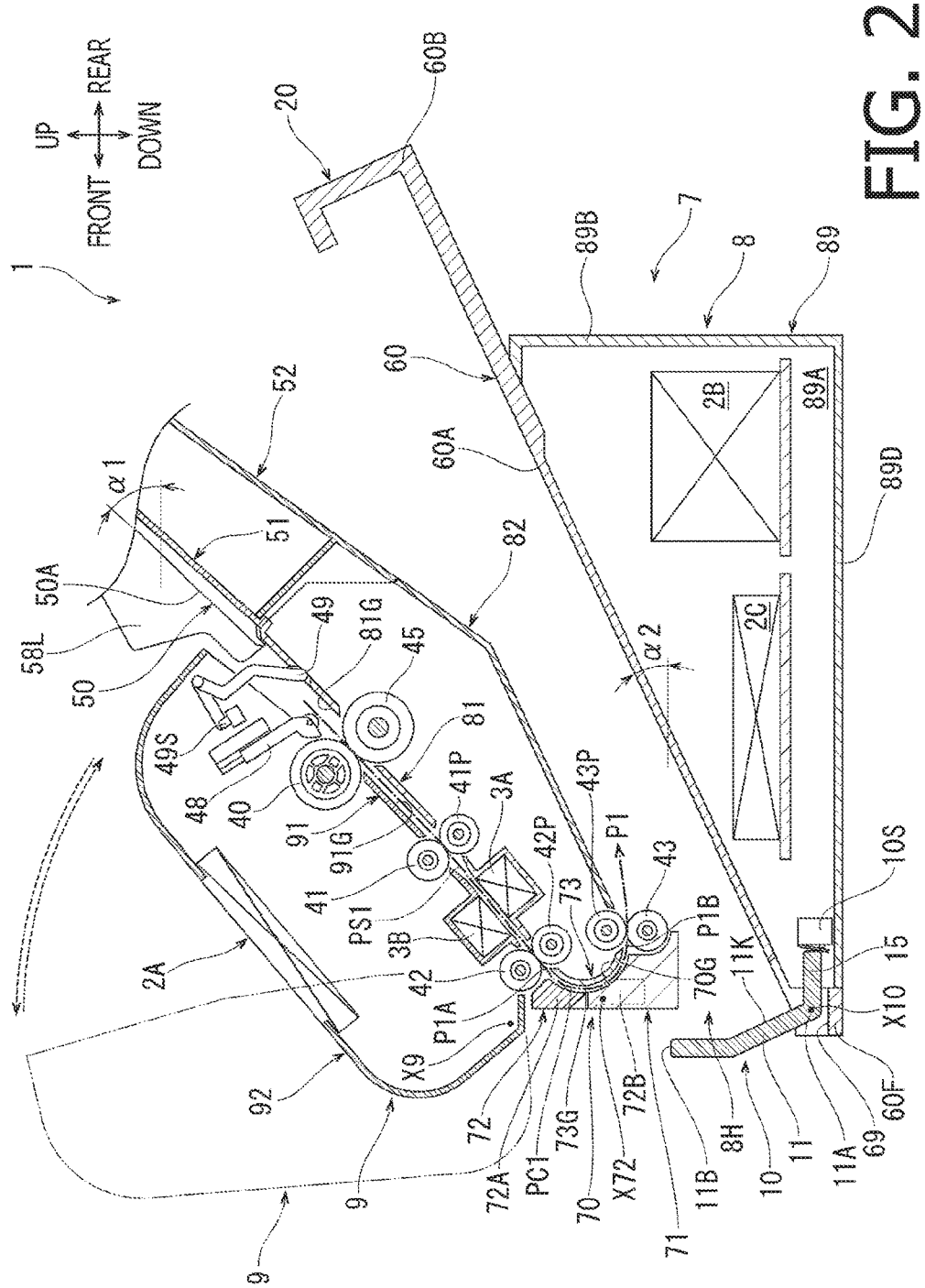
FIG. 2 is a cross-sectional view of the image reading apparatus according to the first embodiment of the present disclosure.
Figure 3:
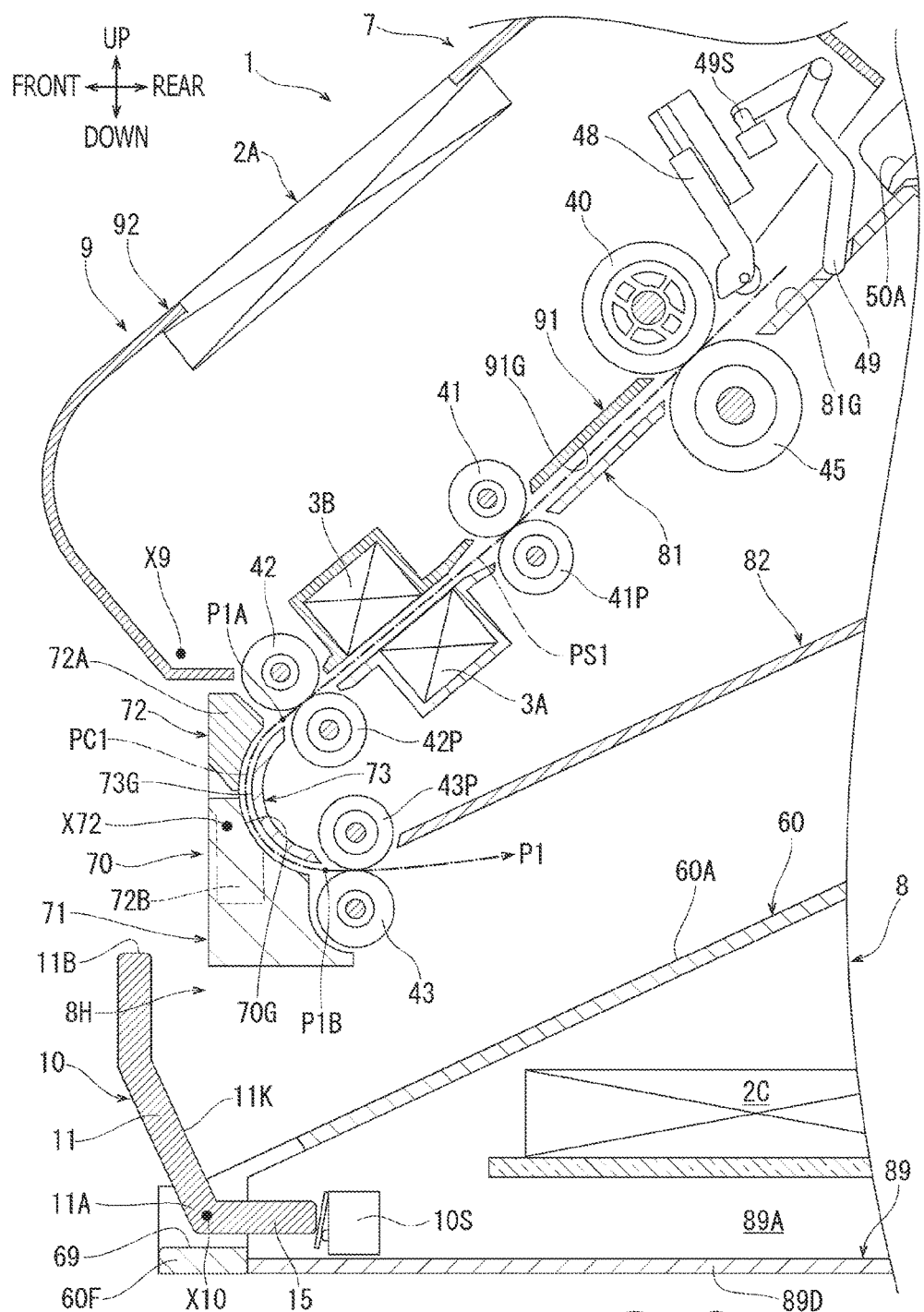
FIG. 3 is a cross-sectional and partly enlarged view of the image reading apparatus according to the first embodiment of the present disclosure.

As shown in FIGS. 1-3, the image reading apparatus 1 includes a housing 7, a feed tray 50, a reversing guide 70, and a discharge tray 60. The housing 7 includes a first housing 8 and a second housing 9. The feed tray 50 is attached to the first housing 8. The reversing guide 70 and the discharge tray 60 are arranged in the first housing 8.

More specifically, as shown in FIG. 2, a first chute member 81, a first cover 82, the reversing guide 70, the discharge tray 60, a base member 89, and an internal frame shown) are assembled together and covered by the paired side covers 88L, 88R (see FIG. 1) at widthwise ends thereof to form the first housing 8. In other words, the first housing 8 includes the first chute member 81, the first cover 82, the reversing guide 70, the discharge tray 60, the base member 89, the internal frame (not shown), and the side covers 88L, 88R.

The base member 89 includes, as shown in FIG. 2, a bottom wall 89D and a rear wall 89B. The bottom wall 89D is located at a lowermost position in the first housing 8 and spreads in the front-rear direction and the widthwise direction. The rear wall 89B stands upward from a rear end portion of the bottom wall 89D and spreads in the vertical direction and the widthwise direction. The base member 89 includes, as shown in FIG. 1, paired lateral walls 89C arranged on the right and the left. While FIG. 1 solely shows the lateral wall 89C on the left, the lateral wall 89C on the right is in the symmetrically equal shape to the lateral wall 89C on the left. The lateral walls 89C are connected to widthwise end portions of the bottom wall 89D and the rear wall 89B.

As shown in FIG. 2, the base member 89 forms a storage space 89A defined by the bottom wall 89D at the bottom, the rear wall 89B at the rear, and the lateral walls 89C on the right and the left. The storage space 89A forms an approximate shape of a right triangle, of which hypotenuse inclines to be higher at the rear and lower at the front, in a view along the widthwise direction.

The discharge tray 60 is a plate member with an upward surface forming a discharge-supporting surface 60A. A frontend portion 60F of the discharge tray 60 is connected with a front end portion of the bottom wall 89D of the base member 89 at the front side of the housing 7. The discharge tray 60 extends upper-rearward from the frontend portion 60F to be higher at the rear and lower at the front. The discharge tray 60 is connected to an upper end portion of the rear wall 89B and closes the storage space 89A from above. The discharge tray 60 extends beyond the upper end portion of the rear wall 89B of the base member 89 further rearward. A rear end portion 60B of the discharge tray 60 is at a position displaced upper-rearward from the upper end portion of the rear wall 89B.

The discharge-supporting surface 60A may be a plane surface and extends from a frontend portion 60F of the discharge tray 60, which is at the front side of the housing 7, to a rear end portion 60B of the discharge tray 60, which is at the rear side of the housing 7, to incline upper-rearward.

The first chute member 81 is located at an upper position in the first housing 8. The first chute member 81 is a plate member with an upward surface forming a lower conveyer surface 81G. The lower conveyer surface 81G inclines upper-rearward from a front side toward a rear side in the housing 7.

The first cover 82 is attached to the first chute member 81 at a lower side of the first chute member 81 to cover a downward surface of the first chute member 81 and parts attached to the first chute member 81. The first cover 82 is spaced apart upward from the discharge-supporting surface 60A of the discharge tray 60. The first cover 82 inclines upper-rearward from the front side toward the rear side in the housing 7. At a part of the first cover 82 between a front end portion and a midst portion, the first cover 82 inclines approximately in parallel with the discharge-supporting surface 60A. At another part of the first cover 82 between the midst portion and a rear end portion, the first cover 82 inclines to be steeper than the discharge-supporting surface 60A to extend more acutely upper-rearward apart from the discharge-supporting surface 60A.

The reversing guide 70 is arranged to face a frontend portion of the first chute member 81 and a frontend portion of the first cover 82 from the front side in the housing 7. The reversing guide 70 is spaced apart upward from the frontend portion 60F of the discharge tray 60. In this regard, the discharge tray 60 is located to be lower than the reversing guide 70 at the frontend portion 60B. In other words, the discharge tray 60 is located at least partly to be lower than the reversing guide 70. Meanwhile, the discharge-supporting surface 60A inclines upper-rearward so that the discharge tray 60 is located to be higher than the reversing guide 70 at the rear end portion 60B. In other words, the discharge tray 60 may be located at least partly to be higher than the reversing guide 70.

As shown in FIGS. 1 and 3, an opening 8H is formed on a front side in the first housing 8. The opening 8H is formed between the frontend portion 60F of the discharge tray 60 and a lower end of the reversing guide 70 having an approximately rectangular outline. A widthwise dimension of the opening 8H is greater than or equal to a widthwise dimension of the discharge-supporting surface 60A.

At the frontend portion 60F of the discharge tray 60, formed is a stopper retainer portion 69 denting downward to be lower than the discharge-supporting surface 60A. The stopper retainer portion 69 is open frontward. Meanwhile, at a frontward position with respect to the discharge tray 60, arranged is a first stopper 10. As shown in FIG. 3, the first stopper 10 includes a stopper body 11 and a protruding portion 15.

The stopper body 11 includes a base portion 11A. With the base portion 11A being inserted in the stopper retainer portion 69 through the frontward opening, the stopper body 11 is pivotably supported by an internal frame (not shown) in the first housing 8 to pivot about a pivot axis X10. The pivot axis X10 extends in the widthwise direction at the frontend portion 60F of the discharge tray 60 virtually through the base portion 11A. The stopper body 11 protrudes from the base portion 11A in a radial direction of the pivot axis X10, bends at an intermediate position, and extends to form a tip end portion 11B.

The protruding portion 15 is continuous with the base portion 11A of the stopper body 11 and protrudes in a radial direction of the pivot axis X10 that intersects with the stopper body 11. In other words, the first stopper 10 may be in a shape of an L in a view along the widthwise direction. As shown in FIG. 1, a widthwise dimension of the first stopper 10 is slightly smaller than a widthwise dimension of the discharge-supporting surface 60A.

Figure 4:
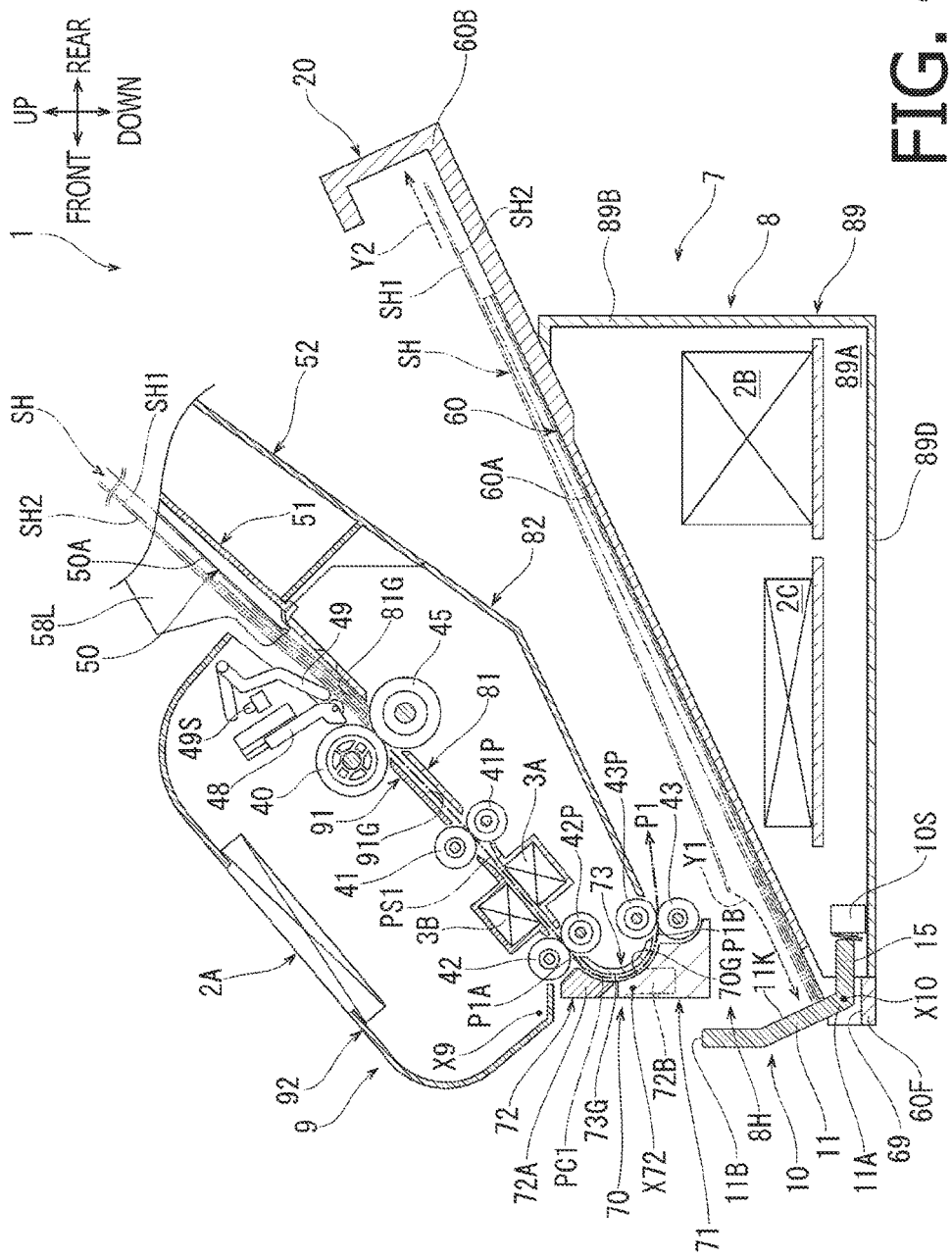
FIG. 4 is a cross-sectional view of the image reading apparatus, illustrating functions of a discharge tray, a first stopper at a closed position, and a second stopper, according to the first embodiment of the present disclosure.
Figure 5:
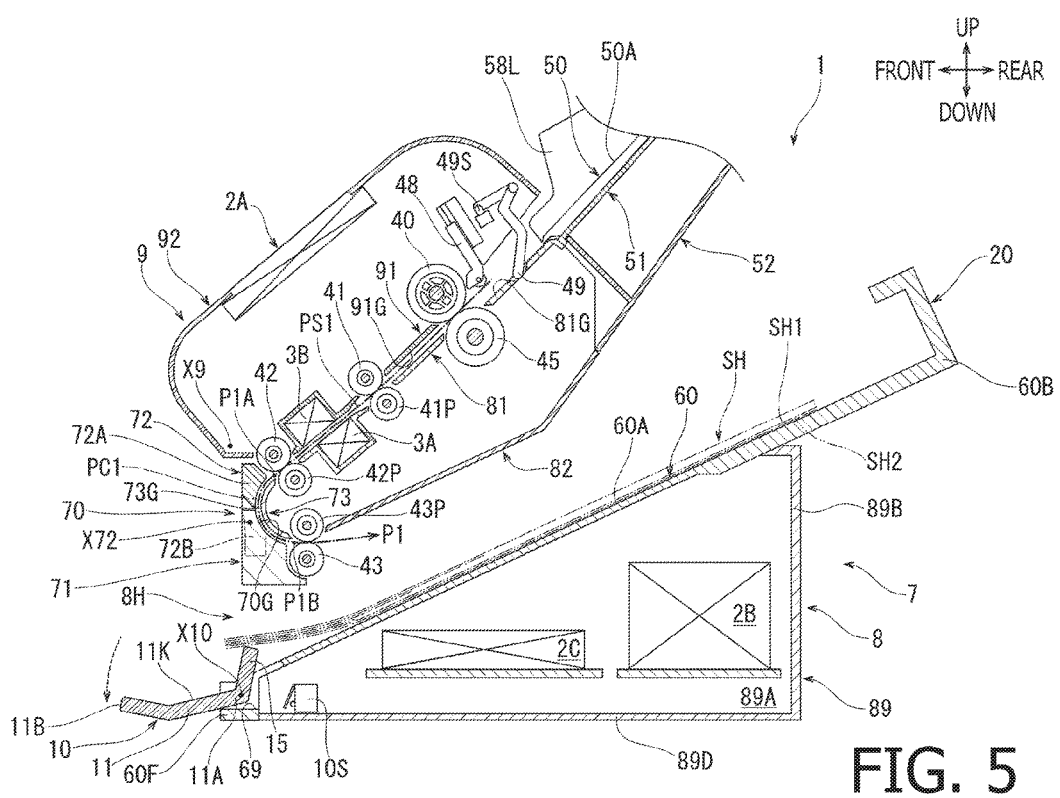
FIG. 5 is a cross-sectional view of the image reading apparatus, illustrating the first stopper shifted to an open position, according to the first embodiment of the present disclosure.

The first stopper 10 is pivotable between a closed position, indicated in solid lines in FIGS. 1-4 and 6, and an open position, as indicated in solid lines in FIG. 5 and in dash-and-dots lines in FIG. 1, by, for example, a manual operation by the user.

When the first stopper 10 is in the closed position, as shown for example in FIGS. 1 and 3, the stopper body 11 covers the opening 8H, and the protruding portion 15 protrudes rearward to retract to a position lower than the discharge-supporting surface 60A. In this posture, a part of the stopper body 11 between the intermediate position and the base portion 11A facing rearward forms a restricting surface 11K, which spreads approximately orthogonally to the discharge-supporting surface 60A. Meanwhile, the tip end portion 11B of the stopper body 11 is located at an approximately same height as the lower end of the reversing guide 70 at a position displaced frontward from the reversing guide 70. In this arrangement, the stopper body 11 may not completely close the opening 8H but may cover the opening 8H leaving a small amount of clearance between the lower end of the reversing guide 70 and the stopper body 11. The amount of the clearance may be substantially small to restrict, for example, entry of a user's finger.

When the first stopper 10 is in the open position, as shown in FIG. 5, the stopper body 11 uncovers the opening 8H, and the protruding portion 15 advances upward to be higher than the discharge-supporting surface 60A of the discharge tray 60.

As shown in FIGS. 1 and 2, a second stopper 20 is arranged at the rear end portion 60B of the discharge tray 60. The second stopper 20 stands upward from the rear end portion 60B of the discharge tray 60 orthogonally to the discharge-supporting surface 60A for a certain height and bends frontward at an upper end thereof.

As shown in FIG. 2, the feed tray 50 includes a tray body 51 and a tray cover 52. The tray body 51 is a plate member with an upward surface forming a feed-supporting surface 50A. The tray cover 52 is attached to the tray body 51 at a lower side of the tray body 52 to cover a downward surface of the tray body 51 and parts attached to the tray body 51.

The feed tray 50 is attached to the first chute member 81 and to the first cover 82. In particular, a frontend portion of the tray body 51 is connected to a rear end portion of the first chute member 81, and a frontend portion of the tray cover 52 is connected with a rear end portion of the first cover 82. The feed-supporting surface 50A inclines upper-rearward. The feed-supporting surface 50A and the lower conveyer surface 81G form a continuous plane. The tray cover 52 inclines, similarly to the part of the first cover 82 between the midst portion and the rear end portion, to be steeper than the discharge-supporting surface 60A to extend upper-rearward farther from the discharge-supporting surface 60A.

The feed-supporting surface 50A to support a sheet SH in the feed tray 50 inclines with respect to a horizontal direction at a first inclination angle $\alpha 1$. The first inclination angle $\alpha 1$ may range, for example, between 40 and 45 degrees. The discharge-supporting surface 60A of the discharge tray 60 inclines with respect to the horizontal direction at a second inclination angle $\alpha 2$. The second inclination angle $\alpha 2$ is smaller than the first inclination angle $\alpha 1$. The second inclination angle $\alpha 2$ may be, for example, at least 25 degrees.

As shown in FIG. 1, the feed-supporting surface 50A in the feed tray 50 may support the sheet SH to be read from below. Further, as shown in FIG. 4, a part of the lower conveyer surface 81G in the first chute member 81 adjoining the feed-supporting surface 50A may, together with the feed-supporting surface 50A, support the sheet SH from below.

As shown in FIG. 1, to a rear end portion of the feed tray 50, attached is a subsidiary feed tray 59. For supporting a sheet SH in a larger size on the feed-supporting surface 50A, the subsidiary feed tray 59 may be drawn upper-rearward from the rear end portion of the feed tray 50, as indicated in dash-and-dots lines in FIG. 1, to assist the feed tray 50 supporting the sheet SH.

On the feed-supporting surface 50A, arranged are width regulating guides 58L, 58R. The width regulating guides 58L, 58R are slidable in the widthwise direction. The width regulating guide 58L on the left and the width regulating guide 58R on the right are coupled with each other through a rack-and-pinion mechanism (not shown) arranged in the feed tray 50 to move in the widthwise direction symmetrically about a widthwise center on the feed-supporting surface 50A to be closer to or farther from each other. Thus, the width regulating guides 58L, 58R may be moved to be closer to or farther from each other to fit to widths of sheets SITE in different sizes, e.g., ranging from a size of a name card to A4 size, supported by the feed-supporting surface 50A so that the sheets SH may be placed in a correct widthwise position on the feed-supporting surface 50A.

As shown in FIGS. 1 and 2, the second housing 9 is arranged at an upper position with respect to the first chute member 81 of the first housing 8. The second housing 9 is pivotably supported by an internal frame (not shown) of the first housing 8 to pivot about a pivot axis X9. The pivot axis X9 extends in the widthwise direction at a position higher than and displaced frontward from the reversing guide 70 in the first housing 8. The second housing 9 may, as a rear portion thereof pivots upper-frontward, move to a position indicated in dash-and-dots lines in FIG. 2. Meanwhile, as shown in FIG. 1, the side covers 88L, 88R in the first housing 8 cover lateral faces of the second housing 9 allowing the second housing 9 to pivot there-between.

As shown in FIG. 2, the second housing 9 includes a second chute member 91 and a second cover 92 assembled together. The second chute member 91 is a plate member with a downward surface forming an upper conveyer surface 91G. The upper conveyer surface 91G in the second housing 9 faces with the lower conveyer surface 81G in the first housing 8 and inclines upward from the front toward the rear in the housing 7.

The second cover 92 is attached to the second chute member 91 from above and covers an upward face of the second chute member 91 and parts attached to the second chute member 91. A front portion of the second cover 92 protrudes frontward with respect to the frontend portion 60F of the discharge tray 60 and the reversing guide 70. A rear portion of the second cover 92 is at a position displaced frontward from the rear wall 89B of the base member 89.

As shown in an enlarged view in FIG. 3, a conveyer path P1 is formed inside the housing 7. The conveyer path P1 includes a straight path PS1 and a curved path PC1.

The straight path PS1 is formed between the lower conveyer surface 81G in the first chute member 81 and the upper conveyer surface 91G in the second chute member 91. The straight path PS1 inclines substantially linearly along the lower conveyer surface 81G and the upper conveyer surface 91G from the rear side toward the front side in the housing 7 to a first position P1A in the conveyer path P1. The straight path PS1 may guide the sheet SH fed to the conveyer path P1 from the rear side toward the front side in the housing 7 to reach the first position P1A.

The second housing 9 is arranged at a frontward and upper position with respect to the first housing 8 across the straight path PS1 in the conveyer path P1. When the second housing 9 is at the position indicated by the dash-and-dots lines in FIG. 2, the upper conveyer surface 91G in the second housing 9 is separated upper-frontward from the lower conveyer surface 81G in the first housing 8. In this posture, the straight path PS in the conveyer path P1 may be exposed to the atmosphere.

As shown in FIG. 3, the curved path PC1 is defined the reversing guide 70 in the first housing 8. The curved path PC1 is connected with the straight path PS1 at the first position P1A and curves to turn lower-rearward to a second position P1B in the conveyer path P1. The second position P1B is lower than the first position P1A and is separated upward from the discharge-supporting surface 60A.

The reversing guide 70 includes a guiding body 71, a switch 72, and an opposing part 73. As shown in FIG. 1, the guiding body 71 extends in the widthwise direction and is coupled to an internal frame (not shown) in the first housing 8 at widthwise ends thereof. The switch 72 includes, as shown in FIGS. 1 and 3, a base portion 72A and teethed portion 72B. The base portion 72A is arranged at an upper position with respect to the guiding body 71 and extends in the widthwise direction. The teethed portion 72B includes a plurality of downward protrusions protruding from a lower end of the base portion 72A. The guiding body 71 is formed to have a plurality of grooves (unsigned) to coincide with the teethed portion 72B so that the teethed portion 72B in the switch 72 may be accommodated in the grooves. The switch 72 is pivotably supported by the guiding body 71 to pivot about a pivot axis X72, which extends in the widthwise direction.

As shown in FIG. 3, on a side of the guiding body 71 and the switch 72 facing rearward, formed is a curved surface 70G. The curved surface 70G curves in an approximate shape of C in a view along the widthwise direction. The curved surface 70G extends between the first position P1A and the second position P1B in the conveyer path P1 and recesses frontward between the first position P1A and the second position P1B.

The opposing part 73 is arranged to face the guiding body 71 and the switch 72 on a rear side with respect to the guiding body 71 and the switch 72. The opposing part 73 is a piece of plate curving in an approximate shape of C in a view along the widthwise direction. On a surface in the opposing part 73 that faces the curved surface 70G, formed is an opposing curved surface 73G. The opposing curved surface 73G extends between the first position P1A and the second position P1B in the conveyer path P1 and bulges frontward along the curved surface 70G.

The curved path PC1 is in clearance between the curved surface 70G, which is the rear surfaces of the guiding body 71 and the switch 72, and the opposing curved surface 73G of the opposing portion 730.

As shown in FIGS. 4 and 5, the sheet SH may be fed from the feed-supporting surface 50A to the conveyer path P1 and guided in the straight path PS1 to reach the first position P1A. When the sheet SH reaches the first position P1A, the reversing guide 70 tray guide the sheet SH from the first position P1A to turn to the second position P1B. In particular, the reversing guide 70 may guide the sheet SH to be conveyed from the rear side toward the front side at the first position P1A, turn the conveying direction for the sheet SH downward through the curved path PC1 between the curved surface 70G and the opposing curved surface 73G, and further turn the conveying direction rearward, to guide the sheet SH to reach the second position P1B in the conveyer path P1.

The sheet SH reaching the second position P1B in the conveyer path P1 may be discharged outside the conveyer path P1. The discharged sheet SH may be supported by the discharge-supporting surface 60A of the discharge tray 60. A face of the sheet SH that faces downward, when the sheet SH is supported by the feed-supporting surface 50A in the feed tray 50, may herein be called as a first face SH1, and a face of the sheet SH that faces upward, when the sheet SH is supported by the feed-supporting surface 50A in the feed tray 50, may herein be called as a second face SH2. As the sheet SH is conveyed in the conveyer path P1, and turned around in a shape of U, as shown in FIGS. 4 and 5, the first face SH1 and the second face SH2 of the sheet SH are reversed, and the sheet may be discharged outside the conveyer path P1 to rest on the discharge-supporting surface 60A. Therefore, the sheet SH supported by the discharge-supporting surface 60A is in such a posture that the first face SH1 faces upward and the second face 5112 faces downward.

Figure 6:
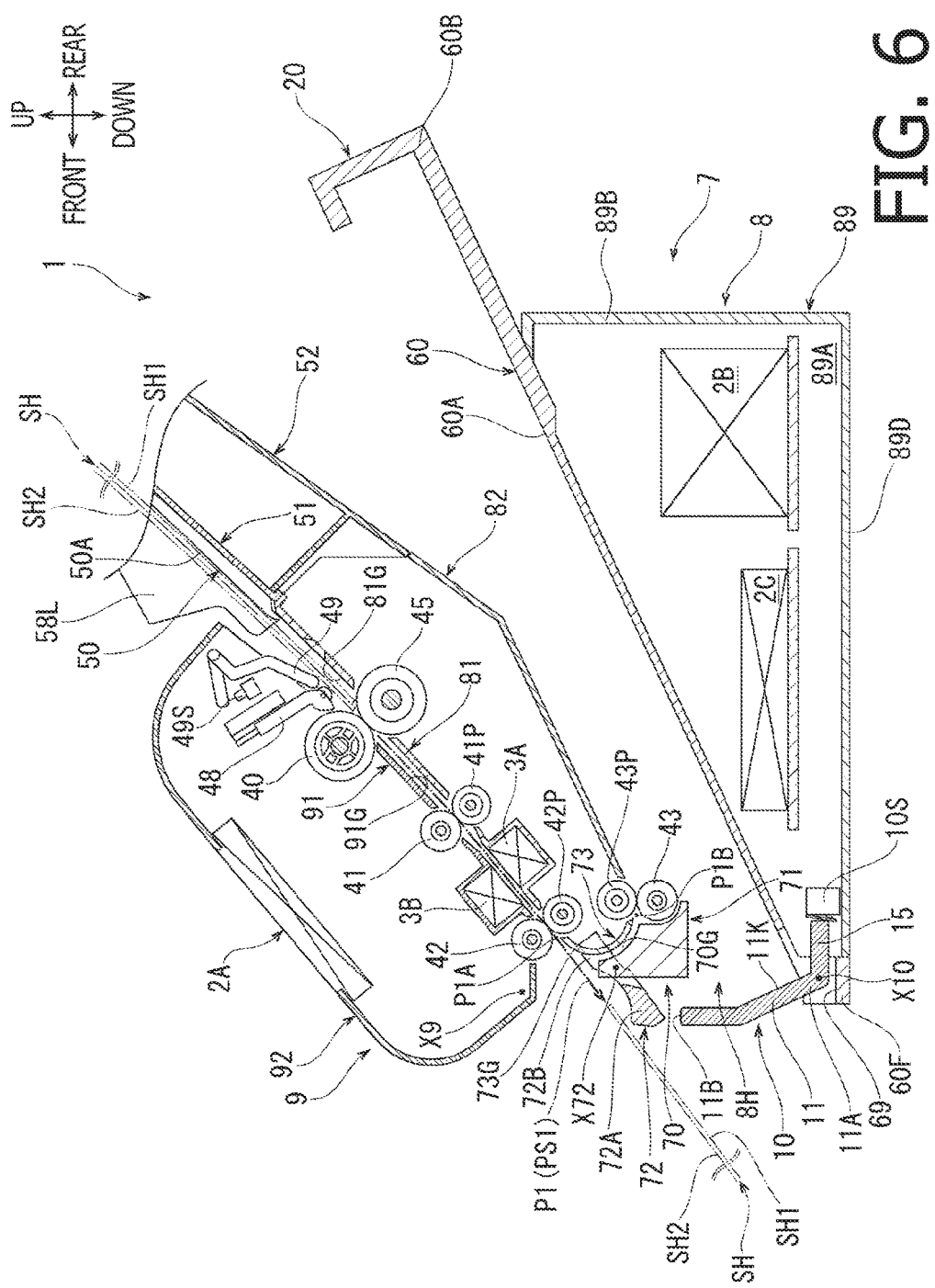
FIG. 6 is a cross-sectional view of the image reading apparatus, illustrating a switch changing conveyer paths, according to the first embodiment of the present disclosure.

The switch. 72 is pivotable by, for example, manual operation by the user, to pivot about the pivot axis X72 between a position shown in FIG. 2 and a switched position shown in FIG. 6. Although not shown in the drawings, the opposing part 73 is formed to have a plurality of grooves to coincide with the teethed portion 72B so that the teethed portion 72B in the switch 72 may be accommodated in the grooves as the switch 72 is in the switched position shown in FIG. 6. With the grooves in the opposing portion 73 accommodating the teethed portion 72B, the switch 72 may shut the curved path PC1 in the conveyer path P1 at a position downstream from the first position P1A in the conveying direction. Meanwhile, the base portion 72A in the switch 72 protrudes lower-frontward. Therefore, the first position P1A may be exposed frontward. In other words, the switch 72 at the switched position shown in FIG. 6 may limit the conveyer path P1 to the straight path PS1 alone.

The image reading apparatus 1 includes, as shown in FIG. 3, a presser 48, a separator roller 40, a retard roller 45, a first conveyer roller 41, a first pinch roller 41P, a first reader sensor 3A, a second reader sensor 3B, a second conveyer roller 42, a second pinch roller 42P, a discharge roller 43, and a discharge pinch roller 43P, which are arranged along the conveyer path P1 in the housing 7. The first reader sensor 3A is arranged in the first housing 8, and the second reader sensor 3B is arranged in the second housing 9.

The image reading apparatus 1 further includes, as shown in FIG. 2, a controller 2C, a power source board 2B, a photo-interrupter 49S, a detector sensor 10S, and an operation panel 2A (see also FIG. 1). Furthermore, as shown in FIG. 1, the image reading apparatus 1 includes a motor M1 first transmission G1, a clutch mechanism C1, and a second transmission G2.

As shown in FIG. 2, the controller 2C and the power source board 2B are arranged in the storage space 89A in the first housing 8. The controller 2C may include a controller board (not shown), on which an electric circuit including a CPU is mounted. The controller 2C may control the motor M1 to rotate the separator roller 40, the first conveyer roller 41, the second conveyer roller 42, and the discharge roller 43. Further, the controller 2C may control the first reader sensor 3A, the second reader sensor 3B, and the operation panel 2A. The power source hoard 29 may supply power to the controller 2C, the motor M1, the first reader sensor 3A, the second reader sensor 39, and the operation panel 2A.

The photo-interrupter 49S is arranged in the second housing 9. The photo-interrupter 49S may detect a posture of a sheet detector 49, which is pivotably supported by the rear portion of the second housing 9. In particular, as shown in FIGS. 2, 3, and 5, when no sheet SH is placed on the feed-supporting surface 50A in the feed tray 50, a lower end of the sheet detector 49 may descend to block a light path to the photo-interrupter 49S. On the other hand, when a sheet SH is placed on the feed-supporting surface 50A in the feed tray 50, the lower end of the sheet detector 49 may be lifted upward by the sheet SH, and the light path to the photo-interrupter 49 may open. The photo-interrupter 49S may transmit a detected result based on the open or blocked state of the light path to the controller 2C.

The detector sensor 10S may be a micro-switch and is arranged in the storage space 89A in the first housing 8. The detector sensor 10S may detect the positions of the first stopper 10. In particular, as shown in FIGS. 2-4 and 6, when the first stopper 10 is at the closed position, the protruding portion 15 may press a contact portion (unsigned) of the detector sensor 10S. On the other hand, as shown in FIG. 5, when the first stopper 10 is at the open position, the protruding portion 15 is separated from the contact portion of the detector sensor 10S. The detector sensor 10S may transmit a detected result based on the pressed or separated state of the contact portion in the detector sensor 10S to the controller 2C.

As shown in FIGS. 1 and 2, the operation panel 2A is attached to the second cover 92 in the second housing 9 on a front side in the housing 7 with a display (unsigned) and operation buttons (unsigned) being exposed. The operation panel 2A is controlled by the controller 2C and may accept commands input by the user and display operation status and setting status of the image reading apparatus 1.

The second reader sensor 39, the operation panel 2A, and the photo-interrupter 49S, which are arranged on the second housing 9, and the controller 2C and the power source board 29, which are arranged on the first housing 8, are connected with one another through a wire harness, including a wire harness 2W shown in FIG. 1.

The wire harness 2W may be an electric wiring assembly with flexibility including a flexible flat cable. The wire harness 2W is drawn outward from the storage space 89A, in which the controller 2C and the power source board 2B are accommodated, extended in the first housing 8 to a front-rightward position, and turned upward to enter the second housing 9. The wire harness 2W includes a bowed portion 2W1, which bows to detour around the pivot axis X9. When the second housing 9 pivots about the pivot axis X9, the bowed portion 2W1 may deform to follow the second housing 9. Thus, the wire harness 2W may absorb the pivot movement of the second housing 9 with respect to the first housing 8.

The motor M1, the first transmission G1, the clutch mechanism C1, and the second transmission G2 are arranged in a leftward area in the first housing 8 and covered laterally by the side cover 88L on the left. The clutch mechanism C1 may include, for example, a first gear (not shown) arranged in the first housing 8 and a second gear (not shown) arranged in the second housing 9. The second gear may engage with or separate from the first gear according to the pivot movement of the second housing 9 with respect to the first housing 8, and the first transmission G1 and the second transmission G2 may be connected with and disconnected from each other through the engagement and disengagement between the first gear and the second gear. For another example, the clutch mechanism C1 may be omitted, and the first transmission G1 and the second transmission G2 may be coupled with each other at all time through a gear or a pulley rotating about the pivot axis X9 while the pivot movement of the second housing 9 with respect to the first housing 8 is absorbed by the gear or the pulley.

The motor M1 is, under the condition where the second housing 9 closes the first housing 8, and where the clutch mechanism C1 couples the first transmission G1 with the second transmission G2, controlled by the controller 2C to move and feed the driving force thereof to the first transmission G1 and the second transmission G2.

As shown in FIG. 3, the presser 48, the separator roller 40, the first conveyer roller 41, the second reader sensor 3B, and the second conveyer roller 42 are arranged in the second housing 9 to align in the mentioned order along the conveyer path P1 from upstream toward the first position P1.

The retard roller 45, the first pinch roller 41P, the first reader sensor 3A, and the second pinch roller 42P are arranged in the first housing 8 to align in the mentioned order along the conveyer path P1 from upstream toward the first position P1.

The discharge roller 43 and the discharge pinch roller 43P are arranged in the first housing 8 at positions displaced rearward with respect to the second position P2A in the conveyer path P1.

The separator roller 40, the first conveyer roller 41, and the second conveyer roller 42 are rotatable by the driving force from the motor M1 transmitted through the first transmission G1, the clutch mechanism C1, and the second transmission G2 (see FIG. 1). The discharge roller 43 may rotate by the driving force from the motor M1 transmitted through the first transmission G1.

The retard roller 45 is pressed against the separator roller 40. A torque limiter, which is not shown, may be attached to the retard roller 45. The first pinch roller 41P is pressed against the first conveyer roller 41. The second pinch roller 42P is pressed against the second conveyer roller 42. The discharge pinch roller 43P is pressed against the discharge roller 43.

The first reader sensor 3A and the second reader sensor 3B are image reader sensors and may be, for example, contact image sensors (CIS) or charge coupled devices (CCD). An upward surface of the first reader sensor 3A being a reader surface, together with the lower conveyer surface 81G, forms a lower part of the straight path PS1 in the conveyer path P1. A downward surface of the second reader sensor 3B being a reader surface, together with the upper conveyer surface 91G, forms an upper part of the straight path PS1 in the conveyer path P1.

As shown in FIG. 4, the presser 48 may guide the sheet SH supported by the feed-supporting surface 50A in the feed tray 50 toward the separator roller 40 and the retard roller 45.

The separator roller 40 may contact a topmost sheet SH among a plurality of sheets SH placed on the feed-supporting surface 50A and convey the topmost sheet SH downstream in the conveying direction along the conveyer path P1. If the separator roller 40 conveys solely the topmost sheet SH downstream, the retard roller 45 may rotate by the torque limiter to follow the rotation of the separator roller 40. On the other hand, if the separator roller 40 conveys a plurality of sheets SH, rotation of the retard roller 45 may be regulated by the torque limiter, and the retard roller 45 may apply a force to stop the sheet(s) SH other than the topmost sheet SH so that solely the topmost sheet SH may be fed to the conveyer path P1.

The first conveyer roller 41 and the first pinch roller 41P may convey the sheet SH separated by the separator roller 40 and the retard roller 45 from the other sheets SH toward the first reader sensor 3A and the second reader sensor 3B in the conveyer path P1.

The first reader sensor 3A may read an image on a downward side, i.e., the first face SH1, of the sheet SH being conveyed in the straight path PS1 in the conveyer path P1. The second reader sensor 3B may read an image on an upward side, i.e., the second face SH2, of the sheet SH being conveyed in the straight path PS1 in the conveyer path P1.

The second conveyer roller 42 and the second pinch roller 42P may convey the sheet SH, of which images on the first face SH1 and the second face SH2 have been read by the first reader sensor 3A and the second reader sensor 3B, respectively, toward the curved path PC1 formed in the reversing guide 70.

The discharge roller 43 and the discharge pinch roller 43P may convey the sheet SH, which passed through the curved path PC1, with the first face SH1 and the second face SH2 thereof being reversed, toward the discharge-supporting surface 60A to rest in the discharge tray 60 outside the conveyer path P1.

When a plurality of sheets SH are discharged to rest on the discharge-support surface 60A, the sheets SIT may be stacked on the discharge-supporting surface 60A in such an arrangement that each sheet SH has the first face SH1 upward and the second face SH2 downward, and in such an order that a subsequent sheet SH is laid over a preceding sheet SH. Therefore, a page sequence among the plurality of sheets SH supported on the feed-supporting surface 50A is maintained unchanged in the plurality of sheets SH before and after the image reading actions passing through the conveyer path P1.

<Image Reading Action>

When the image reading apparatus 1 configured as above is powered on, the controller 2C may determine whether a sheet SH is supported by the feed-supporting surface 50A in the feed tray 50 based on the posture of the sheet detector 49 detected by the photo-interrupter 49S. If the controller 2C determines that no sheet SH is supported on the feed-supporting surface 50A, the controller 2C shifts operation modes of the image reading apparatus 1 to a standby mode.

As shown in FIG. 4, when a sheet SH is placed on the feed-supporting surface 50A, the photo-interrupter 49S detects the change in the posture of the sheet detector 49, and the controller 2C may determine that the sheet SH is supported by the feed-supporting surface 50A based on the detected result.

When the controller 2C receives a command to execute an image reading action, the controller 2C may confirm that the first stopper 10 is at the closed position (see FIG. 2) based on the detected result by the detector sensor 10S. If the first stopper 10 is not at the closed position, the controller 2C may instruct the user to move the first stopper 10 to the closed position through, for example, display in the operation panel 2A and/or audio.

After confirmation of the position of the first stopper 10, the controller 2C starts controlling the motor M1, the first reader sensor 3A, and the second reader sensor 3B. In particular, the controller 2C activates the motor M1; thereby, the driving force from the motor 1411 may be transmitted to the separator roller 40, the first conveyer roller 41, the second conveyer roller 42, and the discharge roller 43 through the first transmission G1, the clutch mechanism C1, and the second transmission G2. The separator roller 40, the first conveyer roller 41, the second conveyer roller 42, and the discharge roller 43 subject to the driving force may start rotating.

The separator roller 40 and the retard roller 45 may nip the sheet SH on the feed-supporting surface 50A and convey the sheets SH downstream in the conveyer path P1 one-by-one from the topmost sheet SH.

The first conveyer roller 41 and the first pinch roller 41P may convey the separated sheets SH one-by-one toward the first reader sensor 3A and the second reader sensor 3B. The first reader sensor 3A and the second reader sensor 3B may read images of the first face SH1 and the second face SH2 of each sheet SH and transmit information concerning the images of each sheet SH to the controller 2C. The second conveyer roller 42 and the second pinch roller 42P, and the discharge roller 43 and the discharge pinch roller 43P, may convey the sheets SH, of which images were read by the first reader sensor 3A and the second reader sensor 3B, to discharge at the discharge-supporting surface 60A in the discharge tray 60.

As indicated by an arrow Y1 shown in FIG. 4, the sheets SH discharged at the discharge-supporting surface 60A may slip on the discharge-supporting surface 60, which inclines with respect to the horizontal direction, and gather on the front side in the housing 7. Front edges of the sheets SH may abut against the restricting surface 11K in the first stopper 10, which is at the closed position. When a plurality of sheets SH are discharged at the discharge-supporting surface 60A, front edges of the sheets SH may align straight along the restricting surface 11K.

As indicated by an arrow Y2 shown in FIG. 4, the sheet SH discharged on the discharge-supporting surface 60A may slip rearward, but the rear end of the sheet SH may abut against the second stopper 20 so that the sheet SH may be restrained from moving further rearward. If a plurality of sheets SH are discharged at the discharge-supporting surface 60A one after another sequentially, a sheet SH discharged earlier and resting on the discharge-supporting surface 60A may be pushed rearward by a sheet SH discharged later due to friction between the sheets SH. However, the rear end of the sheet SH being pushed may abut against the second stopper 20 so that the sheet SH may be restrained from moving further rearward.

The controller 2C may conduct the image reading actions to all of the sheets SH supported on the feed-supporting surface 50A and shift the operation mode of the image reading apparatus 1 to the standby mode. When the image reading apparatus 1 is in the standby mode, the user may move the first stopper 10 to pivot to the open position, as shown in FIG. 5. The stopper body 11 in the open position may uncover the opening 8H. Meanwhile, the protruding portion 15 protrudes upward to be higher than the discharge-supporting surface 60A of the discharge tray 60 and uplifts the sheets SH supported by the discharge-supporting surface 60A at the area in the vicinity of the opening 8H. As a result, clearance may be formed between the sheets SH supported by the discharge tray 60 and the discharge-supporting surface 60A. Therefore, the user's fingers may be inserted in the clearance, and the user may seize the sheets SH easily to pull outward through the opening 8H. In other words, through the opening 8H, the sheet SH may be exposed to the atmosphere and accessible from the outside, and the opening 8H provides an exit for the sheets SH to exit from the discharge tray 60 so that the sheet SH may be removed through the front side of the housing 7 from the discharge tray 60.

Meanwhile, sheets SH having difficulty in passing through the curved path PC1 in the conveyer path P1, such as heavy paper and cards, may be placed on the feed-supporting surface 50A. In this regard, the switch 72 being a part of the reversing guide 70 may be moved to pivot to the switched position. Thereby, the switch 72 may switch the conveyer path P1 to shut off the curved path PC1 and limit the conveyer path P1 solely to the straight path PS1 so that the sheets SH may be conveyed frontward from the feed tray 50 and forwarded linearly to discharge outside the housing 7. Thus, the image reading apparatus 1 may read images of the sheets SH being heavy paper or cards.

<Benefits>

According to the configuration of the image reading apparatus 1 described above, benefits described in the following paragraphs may be achievable.

According to the image reading apparatus 1 in the first embodiment described above, the housing 7 may occupy a footprint area S1 as shown in FIG. 1. In the image reading apparatus 1, as shown in, for example, FIGS. 1 and 2, the conveyer path P1 turns downward by the reversing guide 70, and the feed tray 50 and the discharge tray 60 overlap each other vertically. In other words, the feed tray 50 and the discharge tray 60 do not align in line along the front-rear direction. Therefore, the image reading apparatus 1 may reduce the footprint area S1 in the front-rear direction.

Further, the operation panel 2A of the image reading apparatus 1 is arranged on a front side in the housing 7. In particular, the operation panel 2A is attached to the second cover 92 in the second housing 9. Meanwhile, the feed tray 50 is arranged at the upper-rearward position in the housing 7. In particular, the feed tray 50 is connected to the upper-rearward end portion of the first housing 8 and inclines further upper-rearward. Meanwhile, the discharge tray 60 is arranged at the lower area in the housing 7. In particular, the discharge tray 60 is arranged on the lower side of the housing 8 and vertically overlaps the feed tray 50. In this arrangement of the operation panel 2A, the feed tray 50, and the discharge tray 60, the user may stand to face the operation panel 2A on the housing 7 to set the sheets SH in the feed tray 50 for the support of the feed-supporting surface 50A and to access and pick up the sheets SH supported by the discharge-supporting surface 60A from the discharge tray 60 easily.

According to the image reading apparatus 1 described in the first embodiment, as shown in FIG. 2, the discharge tray 60 is arranged at the lower position with respect to the first cover 82 in the first housing 8 and the tray cover 52 in the feed tray 50. Therefore, the sheets SH supported by the discharge-supporting surface 60A in the discharge tray 60 may be prevented from being affected by external events occurring outside the housing 7. For example, when wind blows around the housing 7, the first cover 82 and the tray cover 52 may block the wind, and the sheets SH supported by the discharge-supporting surface 60A may be prevented from being exposed to the wind. Therefore, the sheets SH supported by the discharge-supporting surface 60A may be prevented from being displaced by the wind from one another in the discharge tray 60 or falling from the discharge tray 60.

For example, the conveyer path P1 in the image reading apparatus a may be designed to turn upward through the reversing guide 70. However, with the upward-turning conveyer path P1, the sheet SH may be guided upward to easily collide with the sheets SH in the feed tray 50, and the sheets SH may not be fed in the conveyer path P1 correctly. Further, the upward-turned sheet SIT may cover the operation panel 2A on the second housing 9 to disturb the user's operation to the operation panel 2A. In this regard, as shown in FIG. 4, the image reading apparatus 1 has the conveyer path P1 that guides the sheet SH downward through the reversing guide 70. Therefore, the sheet SH turned downward may be prevented from colliding with the sheets SH in the feed tray 50, and the sheets SH in the feed tray 50 may be fed in the conveyer path P1 correctly. Further, the reversed sheet SH may not cover the operation panel 2A on the second housing 9; therefore, the user's operability may be maintained or prevented from being lowered.

As shown in FIG. 4, the discharge-supporting surface 60A in the discharge tray 60 inclines to be higher from the front toward the rear in the housing 7. Therefore, the sheets SH on the discharge-supporting surface 60A may slip easily on the discharge-supporting surface 60A by gravity so that the sheets SH may be collected at the front side in the housing 7. As a result, the user may access and pick up the sheets SH from the discharge-supporting surface 60A easily.

As shown in FIG. 2, the second inclination angle $\alpha 2$ between the discharge-supporting surface 60A and the horizontal direction in the image reading apparatus 1 is smaller than the first inclination angle $\alpha 1$ between the feed-supporting surface 50A and the horizontal direction. Due to the difference in the angles, the discharge-supporting surface 60A may be separated substantially apart from the first cover 82 in the first housing 8 and the tray cover 52 in the feed tray 50. Therefore, the sheets SH being discharged at the discharge-supporting surface 60A may be prevented from colliding with the feed tray 50 or being caught by the feed tray 50.

The second inclination angle $\alpha 2$ may be 25 degrees or larger. With this angle setting, the sheets SH in the discharge tray 60 may easily slip on the discharge-supporting surface 60A so that the sheets SH may be easily collected at the front side in the housing 7.

As shown in FIG. 2, the first stopper 10 may be moved to the closed position so that the stopper body 11 may cover the opening 8H. Therefore, the sheets SH supported by the discharge-supporting surface 60A may be restrained from protruding frontward from the opening 811. Further, as shown in FIG. 5, the first stopper 10 may be moved to the open position to expose the opening 8H. Therefore, the user may access and pick up the sheets SH from the discharge-supporting surface 60A easily.

Further, as shown in FIG. 2, the first stopper 10 has the approximate shape of L in the view along the pivot axis X10. When the first stopper 10 is at the closed position, the restricting surface 11K of the stopper body 11 may stand orthogonally to the discharge-supporting surface 60A. Thereby, when the sheets SH on the discharge-supporting surface 60A are collected at the front side in the housing 7, as indicated by the arrow Y1 shown in FIG. 4, the front edges of the sheets SH may abut against the restricting surface 11K to stop thereat, in particular, front edges of a plurality of sheets SH on the discharge-supporting surface 60A may align with one another along the restricting surface 11K. Furthermore, as shown in FIG. 5, when the first stopper 10 is at the open position, the sheets SH supported by the discharge-supporting surface 60A may be uplifted by the protruding portion 15 in the vicinity of the opening 8H. As a result, the clearance may be formed between the sheets SH supported by the discharge tray 60 and the discharge-supporting surface 60A. Therefore, the user may insert his/her fingers underneath the sheets SH easily to seize and pull outward the sheets SH through the opening 8H.

The controller 2C in the image reading apparatus 1 may, when starting the image reading action, confirm that the first stopper 10 is at the closed position (see FIG. 2) based on the detected result by the detector sensor 10S. Thereby, the image reading apparatus 1 may be prevented from conducting the image reading action with the first stopper 10 left at the open position shown in FIG. 5. While the controller 2C conducts the image reading action, the stopper body 11 of the first stopper 10 at the closed position may cover the opening 8H so that the user's finger may be restrained from entering the opening 8H.

As indicated by the arrow Y2 shown in FIG. 4, the sheet SH resting on the discharge-supporting surface 60A may slip rearward, but the rear end of the sheet SH may abut against the second stopper 20 so that the sheet SH may be restrained from moving further rearward. If a plurality of sheets SH are discharged at the discharge-supporting surface 60A one after another sequentially, a sheet SH discharged earlier and resting on the discharge-supporting surface 60A may be pushed rearward by another sheet SH discharged later due to the friction between the sheets SH. However, the rear end of the sheet SH being pushed may abut against the second stopper 20 so that the sheet SH may be restrained from moving further rearward.

As shown in FIG. 2, the second housing 9 is arranged at the frontward and upward position with respect to the first housing 8 across the straight path PS1 in the conveyer path P1. The second housing 9 is pivotably supported by the first housing 8. In the second housing 9, arranged are the second reader sensor 3B, the operation panel 2A, and the photo-interrupter 49S. In the first housing 8, arranged are the first reader sensor 3A, the discharge tray 60, the controller 2A, the power source board 2B, the motor M1, and the detector sensor 10S. In this arrangement, positional relation for the first reader sensor 3A, the motor M1, and the detector sensor 10S with respect to the controller 2C and the power source board 2B may be fixed within the first housing 8 so that the arrangement of the wire harness connecting the first reader sensor 3A, the motor M1, and the detector sensor 10S with the controller 2C and the power source board 2B may be simplified. Meanwhile, connection between the second reader sensor 3B, the operation panel 2A, and the photo-interrupter 49C, which are arranged in the second housing 9, and the controller 2C and the power source board 2B, which are arranged in the first housing 8, may be established by the wire harness including the wire harness 2W that allows the pivot movement of the second housing 9 with respect to the first housing 8 as shown in FIG. 1. In other words, the wire harness may be easily arranged between the first housing 8 and the second housing 9.

Further, with the discharge tray 60 arranged at the lower side in the first housing 8, space formed in lateral areas and a rear area to the discharge tray 60 may be efficiently used to accommodate the controller 2C and the power source board 2B within the first housing 8. In particular, with the inclination of the discharge tray 60, the storage space 89A in the triangular shape in the view along the widthwise direction may be reserved at the rear side of the discharge tray 60 to be used efficiently.

As shown in FIG. 6, the switch 72 being a part of the reversing guide 70 is movable to pivot to the switched position so that the switch 72 may switch the conveyer path P1 to shut off the curved path PC1 and limit the conveyer path P1 sole to the straight path PS1 so that the sheets SH may be conveyed frontward from the feed tray 50 and forwarded linearly to discharge outside the housing 7. Thus, the image reading apparatus 1 tray read images of the sheets SH being heavy paper or cards, which may have difficulty in passing through the curved path PC1 in the conveyer path P1.

Second Embodiment

Next, with reference to FIG. 7, described below will be a second embodiment of the present disclosure. In the following description, items or structures which are substantially the same as or similar to those described in the first embodiment may be denoted by the same reference signs, and description of those may be omitted. As shown in FIG. 7, the image reading apparatus in the second embodiment may be different from the image reading apparatus 1 in the first embodiment in that the image reading apparatus 1 has a first stopper 210 in place of the first stopper 10.

The first stopper 210 includes a stopper body 211 and a slider 215. The stopper body 211 may be in a similar form to the stopper body 11 in the first stopper 10 in the first embodiment protruding from a base portion 211A, bending at an intermediate position, and ending, to form a tip end portion 211B. While the stopper body 11 in the first embodiment is pivotable to pivot about the pivot axis X10, the base portion 211A in the stopper body 211 is not pivotable.

The slider 215 is continuous with the base portion 211A of the stopper body 211 and extends rearward approximately horizontally in the housing 7. The slider 215 is slidably supported by a slider guide 69G, which is arranged in the stopper retainer portion 69, to slide in the front-rear direction in the housing 7.

The first stopper 210 may be, for example, manually operated by the user so that the slider 215 may be guided by the slider guide 69G to slide in the front-rear direction between a closed position, indicated in solid lines in FIG. 7, and an open position, indicated in dash-and-dots lines in FIG. 7.

When the first stopper 210 is at the closed position indicated in the solid lines in FIG. 7, the stopper body 211 may cover the opening 811. In this position, a part of the stopper body 211 between an intermediate position and the base portion 211A facing rearward forms a restricting surface 211K, which spreads approximately orthogonally to the discharge-supporting surface 60A. Meanwhile, the tip end portion 211B of the stopper body 211 is located at an approximately same height as the lower end of the reversing guide 70 at a position displaced frontward from the reversing guide 70. In this arrangement, the stopper body 211 may not completely close the opening 8H but may cover the opening 8H leaving a small amount of clearance between the lower end of the reversing guide 70 and the stopper body 211. The amount of the clearance may be substantially small to restrict, for example, entry of a user's finger.

When the first stopper 210 is in the open position, as indicated in the dash-and-dots lines shown in FIG. 7, the stopper body 211 uncovers the opening 8H.

According to the image reading apparatus in the second embodiment, the benefits achievable by the image reading apparatus 1 in the first embodiment may be equally achievable.

Although examples of carrying out the disclosure have been described, those skilled in the art will appreciate that there are numerous variations and permutations of the image reading apparatus that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the image reader sensor may not necessarily be limited to the first reader sensor 3A attached to the first housing 8 and the second reader sensor 3B attached to the second housing 9 while the first housing 8 and the second housing 9 are separable from each other, but the image reader sensors may be attached to a single housing, which is not separable into two or more pieces.

For another example, the first stopper 10, 210 may not necessarily cover the opening 8H at the closed position leaving the small amount of clearance, but the first stopper 10, 210 may completely cover the opening 8H so that the opening 8H may not be seen from outside of the housing. For another example, the first stopper 10, 210 may be omitted leaving the opening 8H exposed frontward.

For another example, the present disclosure may not necessarily be applied to the single-functioned image reading apparatus 1, but the image reading apparatus described above may be applied to, for example, a multifunction device.

What is claimed is:

1. An image reading apparatus, comprising:
a housing, in which a conveyer path is formed, an operation panel being arranged on a front side of the housing;
a feed tray configured to support a sheet to be fed to the conveyer path; and
a reader sensor configured to read an image on the sheet being conveyed in the conveyer path,
wherein the housing comprises:
a reversing guide forming a part of the conveyer path, the reversing guide being configured to reverse a first face of the sheet and a second face of the sheet, the reversing guide being configured to guide the sheet from a first position in the conveyer path toward a second position lower than the first position in the conveyer path, the reversing guide being configured to guide the sheet in a direction from a rear side toward the front side in the housing at the first position and in a direction from the front side toward the rear side in the housing at the second position;
a discharge tray arranged at a position lower than the reversing guide, the discharge tray being configured to support the sheet discharged from the conveyer path; and
an opening formed between the reversing guide and the discharge tray, the opening being configured to expose the sheet supported by the discharge tray so that the sheet is removable through the front side of the housing from the discharge tray.

2. The image reading apparatus according to claim 1, wherein the discharge tray comprises a discharge-supporting surface configured to support the sheet, a rear side of the discharge-supporting surface being higher than a front side of the discharge-supporting surface.

3. The image reading apparatus according to claim 2, wherein the feed tray comprises a feed-supporting surface, the feed-supporting surface inclining with respect to a horizontal direction at a first inclination angle, and
wherein the discharge-supporting surface in the discharge tray inclines with respect to the horizontal direction at a second inclination angle being smaller than the first inclination angle.

4. The image reading apparatus according to claim 3, wherein the second angle is at least 25 degrees.

5. The image reading apparatus according to claim 1, further comprising:
a front stopper arranged on the front side of the housing, the front stopper being configured to move between a closed position and an open position, the front stopper covering the opening when the front stopper is positioned at the closed position, and the front stopper exposing the opening when the front stopper is positioned at the open position.

6. The image reading apparatus according to claim 5, wherein the front stopper comprises:
a stopper body pivotally supported by the housing to pivot about a pivot axis, the pivot axis extending in a widthwise direction of the housing at a front end portion in the discharge tray, the stopper body protruding in a radial direction of the pivot axis; and
a protruding portion protruding in a radial direction of the pivot axis to intersect with the stopper body,
wherein, when the front stopper is at the closed position, the stopper body is configured to cover the opening, and the protruding portion is configured to retract to a position lower than a discharge-supporting surface, the discharge-supporting surface being configured to support the sheet in the discharge tray, and
wherein, when the front stopper is at the open position, the stopper body is configured to uncover the opening, and the protruding portion is configured to advance to a position higher than the discharge-supporting surface.

7. The image reading apparatus according to claim 5, further comprising:
a conveyer roller arranged along the conveyer path, the conveyer roller being configured to convey the sheet;
a controller configured to control the conveyer roller and the reader sensor; and
a detector sensor configured to detect whether the front stopper is at the closed position,
wherein the controller is configured to confirm that the front stopper is at the closed position based on a detected result by the detector sensor when the controller controls the conveyer roller and the reader sensor to conduct an image reading action.

8. The image reading apparatus according to claim 1, further comprising:
a rear stopper arranged at a rear end portion in the discharge tray, the rear stopper being configured to contact the sheet discharged at the discharge tray to stop the sheet from moving further rearward.

9. The image reading apparatus according to claim 1, wherein the reader sensor comprises:
a first reader sensor configured to read an image on the first face of the sheet being conveyed in the conveyer path; and
a second reader sensor configured to read an image on the second face of the sheet being conveyed in the conveyer path,
wherein the housing comprises:
a first housing; and
a second housing arranged at a front side of the first housing at an upper position with respect to the first housing across the conveyer path, the second housing being pivotably supported by the first housing,
wherein the second reader sensor and the operation panel are arranged in the second housing, and
wherein the first reader sensor, the discharge tray, and a power source board are arranged in the first housing, the power source board being configured to supply power to the first reader sensor, the second reader sensor, and the operation panel.

10. The image reading apparatus according to claim 1, wherein the reversing guide includes a switch, the switch being configured to move to switch directions to convey the sheet being conveyed in the conveyer path and guide the sheet being conveyed toward the front side in the housing to be conveyed from the feed tray continuously linearly to be discharged outside the housing.

* * * * *

UNITED STATES PATENT AND TRADEMARK OFFICE
CERTIFICATE OF CORRECTION

| | | |
|---|---|---|
| PATENT NO. | : 10,440,215 B2 | Page 1 of 1 |
| APPLICATION NO. | : 16/117365 | |
| DATED | : October 8, 2019 | |
| INVENTOR(S) | : Tetsuo Ito | |

It is certified that error appears in the above-identified patent and that said Letters Patent is hereby corrected as shown below:

On the Title Page

Item (57):
Delete "toward, the" and insert --toward the--

In the Claims

Column 17, Claim 4, Line 45:
Delete "second angle" and insert --second inclination angle--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*